Figure 1:
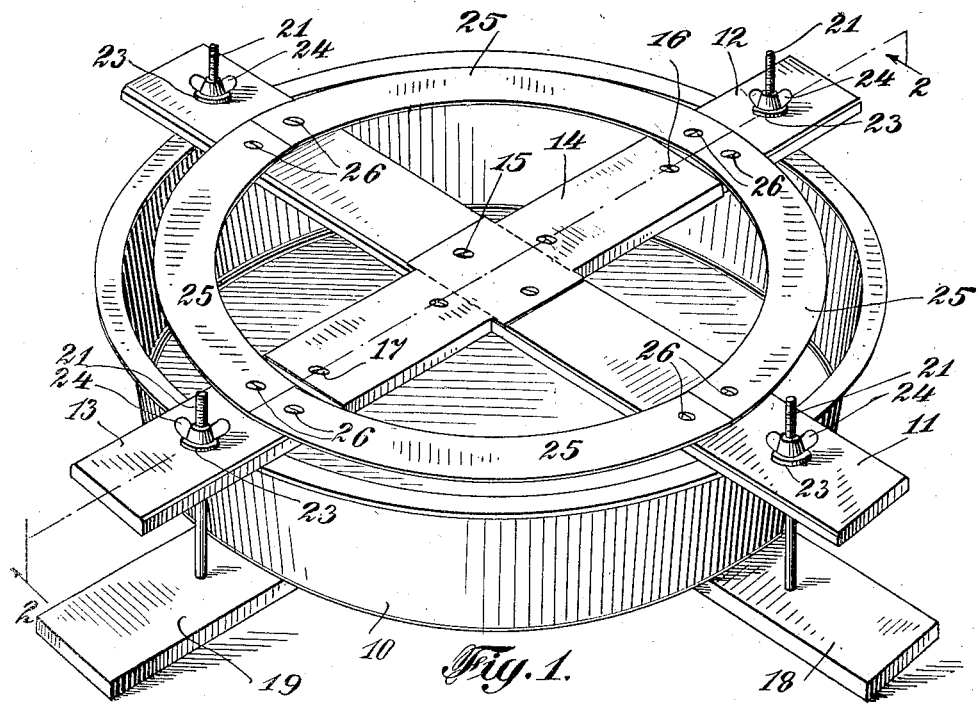

F. W. CARPENTER.
FEED HOLDER.
APPLICATION FILED OCT. 11, 1919.

1,329,288.

Patented Jan. 27, 1920.

Inventor
Francis W. Carpenter
By Sewell & Son
HIS Attorneys

UNITED STATES PATENT OFFICE.

FRANCIS W. CARPENTER, OF GREENWICH, CONNECTICUT.

FEED-HOLDER.

1,329,288.     Specification of Letters Patent.     Patented Jan. 27, 1920.

Application filed October 11, 1919. Serial No. 330,069.

*To all whom it may concern:*

Be it known that I, FRANCIS W. CARPENTER, a citizen of the United States, residing at Greenwich, in the county of Fairfield and State of Connecticut, have invented an Improvement in Feed-Holders, of which the following is a specification.

This invention relates to a feed and drink holder for poultry, and the object thereof is the provision of a relatively inexpensive device which can be readily assembled to contain the pan or receptacle for holding the feed or drink and from which the pan or receptacle may be as readily removed for cleansing and other purposes, and which is so constructed that the base of the pan or receptacle is materially extended so that the fowls in stepping or alighting on the rim of the pan or receptacle cannot readily upset the same and spill the contents thereof in feeding. The device also preferably includes an attachment by which the feed or drink cannot be scattered by the fowls in feeding.

In carrying out the invention, I preferably employ a pan or other suitable receptacle together with a frame which extends across the same both at the top and the bottom, and at the bottom reaches appreciably beyond the sides of the pan so as to form an extended base to prevent the same from being readily upset, the parts of the frame being constructed so as to be readily assembled and connected so as to receive, support and maintain the receptacle in position therein. The frame also includes an attachment by which the feed or drink contained in the receptacle is not easily scattered by the fowls in feeding, as will be hereinafter more particularly described.

Figure 2:
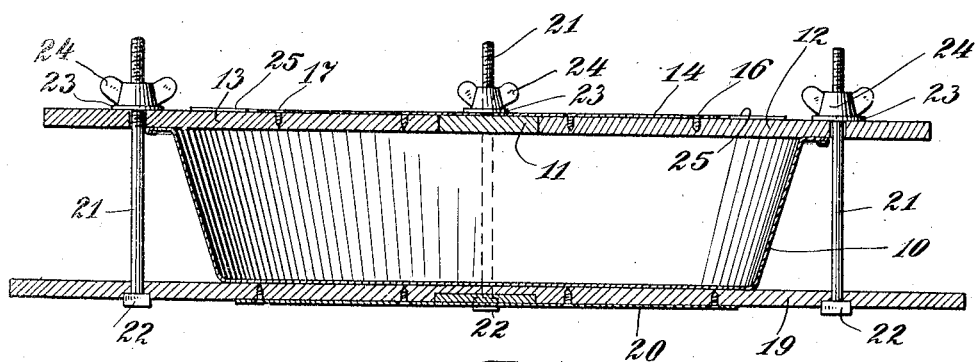

In the drawing:

Figure 1 is a perspective view of the feed holder made in accordance with my invention, and Fig. 2 is a transverse cross section on line 2—2, Fig. 1.

Referring to the drawing, it will be seen that in carrying out this invention, the feed holder made in accordance therewith preferably includes a pan or other suitable receptacle 10 which, as will be understood, may be made of tin, porcelain, or any other material and in the usual flat tin pan shape, as illustrated, or of any other configuration. Together with the pan, there is associated a frame comprising an upper frame member and a lower frame member together with means for securing the parts of the frame member together. The upper frame member comprises a cross bar 11, and side bars 12 and 13. The cross bar 11 is of sufficient length to extend across the pan or receptacle centrally and to reach an appreciable distance beyond the edges thereof. The side bars 12 and 13 are connected to the cross bar 11 by a suitable cleat 14 or otherwise. This cleat may be conveniently made of sheet metal and is secured to the cross bar 11 by screws 15, while the side bars 12 and 13 are secured to the cleat by screws indicated at 16 and 17 respectively. As illustrated, the sides of the cleat extend over the edges of the side bars to provide additional strength to the frame structure when the parts are assembled. Also as illustrated, these side bars extend at right angles from the cross bar and only two of them are employed, but obviously, any number of side bars, together with a suitably formed cleat may be employed, the side bars being of sufficient length, that when the parts are assembled, the ends thereof extend beyond the rim of the pan or receptacle to the same extent that the ends of the cross bar extend. The lower frame member is constructed in a manner precisely similar to that hereinbefore described in connection with the upper frame member. The cross bar in the lower frame member is indicated at 18, the side bar members at 19 and the sheet metal cleat at 20, it will be observed, however, that the parts forming the lower frame member are appreciably longer than the parts forming the upper frame member so as to increase the supporting base of the receptacle to the desired or required width to prevent the receptacle from being tilted or upset by the fowls in stepping or alighting on the rim thereof while feeding.

The parts of the frame are secured to one another by means of bolts 21. These bolts 21 are passed through the ends of the upper and lower frame members adjacent the extremities thereof with the heads 22 of the bolts preferably extending into the recesses provided therefor in the parts of the lower frame member. Above the parts of the upper frame member each bolt is provided with a washer 23 and a wing nut 24 by means of which the parts of the frame may be secured together with the pan or receptacle between the upper and lower frame members to support and maintain the pan in position. Furthermore, it will be observed, that the pan is readily removable from the frame by loosening the nuts on all the bolts and removing one of the bolts.

In order to prevent the fowls, during feeding, from scattering the feed or the drink contained in the pan or receptacle, I also prefer to employ a ring made of segments 25 and secured to the parts of the upper frame member by screws 26 or otherwise, the diameter of the ring being appreciably less than that of the pan 10. As illustrated, the ends of the segments 25 are caused to abut, but the same may be made to overlap so that the ends of adjacent segments may be secured in the underlying parts of the upper frame member by a single screw. This ring, or the segments of which the ring is made, as will be understood, prevents the fowls in feeding from the receptacle from scattering or spilling the feed or drink contained in the receptacle, and as hereinbefore stated, the parts of the device, as will now be appreciated, may be packed and shipped in an unassembled condition, may be readily assembled for use, and due to the extension of the parts of the lower frame beyond the sides of the receptacle, the frame will prevent the fowls during the feeding, from upsetting the receptacle by stepping on the edge of the receptacle or alighting on the same and thus spilling the contents thereof.

While I have herein shown and described a frame for receiving and containing the feed receptacle with the upper member of the frame composed of cross bars which extend appreciably beyond the rim of the receptacle, it will be understood that the frame may be so constructed that the upper member thereof comprises a cover for the receptacle and is provided with one or more openings through which the fowls may obtain the feed, and in such a construction the upper member or the cover may be secured to the lower member in any desired manner so as to maintain the pan or receptacle in position between the parts of the frame.

I claim as my invention:

1. A feed holder for poultry comprising a receptacle, a two part frame member having one part extending above and the other below the receptacle, and clamping devices for securing the parts of the frame member to one another to fasten the receptacle in position between them.

2. A feed holder for poultry comprising a receptacle, an upper frame member, a lower frame member, and clamping devices for securing the upper and lower frame members together to retain the receptacle between the same, the said lower frame member extending beyond the edges of the receptacle so that the frame members and the intervening receptacle cannot be overturned by fowls in feeding therefrom.

3. A feed holder for poultry comprising a receptacle, a cross bar, side bars extending therefrom, a cleat for securing the said side bars to the cross bar to form an upper frame member to extend across the top of the receptacle, a second cross bar, side bars extending therefrom, a cleat member for securing the last aforesaid cross bar and its side bars together to form a lower frame member which extends appreciably beyond the base of the receptacle, and means for securing the parts of the said upper and lower frame members together to retain the receptacle in place between them.

4. A feed holder for poultry comprising a receptacle, a frame comprising cross bars extending above and below the receptacle and reaching beyond the edges thereof in such a manner that the receptacle cannot be overturned by fowls in feeding therefrom, clamping devices for securing the cross bars of the frame together and devices associated with the said cross bars extending above the said receptacle for preventing the fowls from scattering the feed in taking the same from the receptacle.

5. A feed holder for poultry comprising a receptacle, a cross bar, side bars extending therefrom, a cleat for securing the said side bars to the cross bar to form an upper frame member to extend across the top of the receptacle, a second cross bar, side bars extending therefrom, a cleat member for securing the last aforesaid cross bar and its side bars together to form a lower frame member which extends appreciably beyond the base of the receptacle, means for securing the parts of the said upper and lower frame members together to retain the receptacle in place between them, and a ring member formed of segments secured to the cross bar and side bars forming the upper frame member to prevent the fowls from scattering the feed in taking the same from the receptacle.

6. A feed holder for poultry comprising a multiple part frame, a receptacle adapted to be received and held in position between the parts of the said frame, one of which is provided with openings to permit poultry feeding and drinking therethrough from the said receptacle, and a clamping device for securing the parts of the frame together to maintain the said receptacle in position in the frame.

7. A feed holder for poultry comprising a frame having arms of variable length adapted to receive and retain receptacles of different sizes, a receptacle, and clamping devices for securing the said arms of the frame together to secure the receptacle in place between them whereby the said frame and receptacle may be completely overturned manually for cleaning and other purposes, a part of the frame extending beyond the said receptacle and forming a base therefor so that the frame and intervening receptacle cannot be overturned by the poultry in eating and drinking therefrom.

Signed by me this 8th day of October, 1919.

FRANCIS W. CARPENTER.